United States Patent
Hood et al.

(10) Patent No.: US 12,355,115 B2
(45) Date of Patent: Jul. 8, 2025

(54) COAXIAL FUEL CELL CATHODE FLOW PATH DUCTING

(71) Applicant: INTELLIGENT ENERGY LIMITED, Loughborough (GB)

(72) Inventors: Tom Hood, Loughborough (GB); Peter David Hood, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 364 days.

(21) Appl. No.: 17/919,924

(22) PCT Filed: Apr. 20, 2021

(86) PCT No.: PCT/EP2021/060278
§ 371 (c)(1),
(2) Date: Oct. 19, 2022

(87) PCT Pub. No.: WO2021/214086
PCT Pub. Date: Oct. 28, 2021

(65) Prior Publication Data
US 2023/0170498 A1    Jun. 1, 2023

(30) Foreign Application Priority Data
Apr. 20, 2020  (GB) ...................... 2005711
Apr. 20, 2020  (GB) ...................... 2005713

(51) Int. Cl.
*H01M 8/04*       (2016.01)
*H01M 8/04014*    (2016.01)
*H01M 8/04746*    (2016.01)

(52) U.S. Cl.
CPC ... *H01M 8/04014* (2013.01); *H01M 8/04768* (2013.01)

(58) Field of Classification Search
CPC ..................... H01M 8/04014; H01M 8/04768
See application file for complete search history.

(56) References Cited

U.S. PATENT DOCUMENTS

| | | |
|---|---|---|
| 2011/0117470 A1 | 5/2011 | Aras et al. |
| 2011/0159393 A1 | 6/2011 | Takemoto et al. |
| 2016/0164117 A1 | 6/2016 | Na et al. |
| 2022/0093946 A1* | 3/2022 | Kim ................. F28D 21/0015 |

FOREIGN PATENT DOCUMENTS

WO    WO 2016/141085 A1    9/2016

OTHER PUBLICATIONS

International Patent Application No. PCT/EP2021/060278; Int'l Written Opinion and Search Report; dated Jul. 20, 2021; 11 pages.
International Patent Application No. PCT/EP2021/060278; Int'l Preliminary Report on Patentability dated Oct. 25, 2022; 8 pages.

* cited by examiner

Primary Examiner — Olatunji A Godo
(74) *Attorney, Agent, or Firm* — BAKER HOSTETLER, LLP

(57) ABSTRACT

Aspects of duct systems for use with fuel cells and methods of using the same are disclosed. According to an aspect of the disclosure, a duct system (10) for cooling fuel cells (12) via a coolant fluid includes a housing (100); a cooling chamber (112); an inlet port (120) configured to receive the coolant into the system; an exhaust port (130) configured to expel the coolant from the system; and a means for moving the coolant into, through, and out of the system.

9 Claims, 13 Drawing Sheets

COAXIAL FUEL CELL CATHODE FLOW PATH DUCTING

CROSS REFERENCE TO RELATED APPLICATIONS

This application is the US National Phase of International Application No. PCT/EP2021/060278, filed Apr. 20, 2021, titled COAXIAL FUEL CELL CATHODE FLOW PATH DUCTING, which claims the benefit of GB Patent Application No. 2005713.9 filed Apr. 20, 2020, and GB Patent Application No. 2005711.3 filed Apr. 20, 2020, the contents of which are incorporated by reference herein in their entirety.

TECHNICAL FIELD

This disclosure generally relates to devices and methods for cooling fuel cell stacks, and more particularly relates to new designs for moving air to cool fuel cells.

BACKGROUND

Conventional electrochemical fuel cells convert fuel and oxidant into electrical energy and a reaction product. A common type of electrochemical fuel cell comprises a membrane electrode assembly (MEA), which includes a polymeric ion (proton) transfer membrane between an anode and a cathode flow paths or gas diffusion structures. The fuel, such as hydrogen, and the oxidant, such as oxygen from air, are passed over respective sides of the MEA to generate electrical energy and water as the reaction product. A stack may be formed comprising a number of such fuel cells arranged with separate anode and cathode fluid flow paths. Such a stack is typically in the form of a block comprising numerous individual fuel cell plates held together by end plates at either end of the stack. Such fuel cells can be used to provide power for various technology, such as materials handling equipment (MHE) and stationary power applications and unmanned aerial vehicles (UAVs).

It is important that the polymeric ion transfer membrane remains hydrated for efficient operation. It is also important that the temperature of the stack is controlled. Thus, coolant may be supplied to the stack for cooling and/or hydration. It may be necessary at particular times or periodically to purge the flow paths or gas diffusion structures of the fuel cell of coolant, contaminants, or reaction by-products using a purge gas. The purge gas, which may comprise the fuel (e.g. hydrogen) may be flowed through the anode flow path to purge the fuel cell.

Systems that utilize such fuel cells and fuel cell stacks may be cooled and hydrated in a variety of different ways. There are shortcomings with existing systems for cooling and hydrating fuel cell stacks. In some existing technologies, gas (e.g. air) can be taken into the system to cool and/or hydrate the fuel cell stack. The gas can be taken in at one end of the system and exhausted from another end of the system. Such an arrangement is not always preferable or suitable for MHE applications, in which the fuel cell stack system unit must be installed into a very densely packed battery box. Exhausting the gas through many densely packed components would result in a substantial pressure drop, and thus, lower efficiency and poor system performance. Furthermore, in many existing MHE applications, the system unit is often inaccessible on all sides due to the fact that the existing battery boxes often require only a single accessible face for installation and removal operations. To modify existing MHE vehicles to allow the exhausting of the gases from a secondary face, the vehicles would need to be re-certified at great cost to the customer. Therefore, there is a need for an improved system for cooling and/or hydrating the fuel cell stacks used in MHE.

Quantity of gas that is used to cool and/or hydrate the fuel cell can differ in various applications. In some instances, it is difficult to control how much gas is directed to the fuel cell stack. Therefore, there is also a need for improved control of gas distribution that is used to cool and/or hydrate the fuel cell stack.

Proposed solutions described throughout this application are directed to divert the exhaust gases, or intake gases depending on the configuration, of the fuel cell unit by 180 degrees so that all gases entering and exiting the system do so through a single face. Solutions may also, or alternatively, be directed to providing a control mechanism for modulating how much gas is used to cool and/or hydrate the fuel cell stack.

SUMMARY

The foregoing needs are met by the various aspects of coolant distribution systems, fuel cell power systems, and methods of use disclosed throughout this application. According to an aspect of the disclosure, a duct system for cooling fuel cells via a coolant fluid includes a housing; a cooling chamber; an inlet port configured to receive the coolant into the system; an exhaust port configured to expel the coolant from the system; and a means for moving the coolant into, through, and out of the system.

Optionally, housing may have an exterior surface and an interior surface opposite the exterior surface.

Optionally, the interior surface may define an interior volume. The cooling chamber may be defined by the interior surface and be within the interior volume.

Optionally, the housing may include a first face and a second face spaced from the first face along a first direction. The intake port and the exhaust port may be on the first face.

Optionally, the housing may include an intake channel and an exhaust channel, the intake channel and the exhaust channel being in fluid communication with the cooling chamber and with each other, wherein the intake channel is in fluid communication with the inlet port and the exhaust channel is in fluid communication with the exhaust port.

Optionally, the system may include a plurality of intake ports. Each of the plurality of intake ports may be disposed radially around the exhaust port.

Optionally, the housing may include a component thereon that extends into the cooling chamber and is configured to direct the coolant to a predetermined region of the cooling chamber.

Optionally, the housing may include a means for increasing turbulence of the air flow through one or more of the intake channel, the exhaust channel, and the cooling chamber.

Optionally, the housing may define a protrusion extending therefrom, the protrusion defining one or both of the intake port and the exhaust port, the protrusion being configured to direct the coolant along a predetermined flow path.

Optionally, the system may further include a bypass chamber separate from the cooling chamber, the bypass chamber being in fluid communication with the exhaust port. The system may further include a control means configured to direct the coolant to one or more components of the system. The control means may have a first configuration, in which the control means is configured to direct all of the coolant to the cooling chamber and none of the coolant to the bypass chamber. The control means may have a second configuration, in which the control means is configured to direct all of the coolant to the bypass chamber and none to the cooling chamber. The control means may have a third configuration, wherein a first portion of the coolant is directed to the cooling chamber while a second portion of the coolant is directed to the bypass chamber. In some aspects, the control means may be a valve. Optionally, the valve may be a solenoid valve. Optionally, the valve may be a knob valve. Optionally, the control means may be a louver.

Optionally, the coolant in the system may include air.

Optionally, the system may be configured to cool a fuel cell disposed within the cooling chamber.

In some aspects, the exhaust port may be surrounded, at least in part, by the one or more intake ports.

The system may be configured to receive the coolant through the intake port along one or more inlet axes, each of the one or more inlet axes being parallel to each other.

In some aspects, the system may be configured to exhaust the coolant through the exhaust port along one or more outlet axes, each of the one or more outlet axes being parallel to each other.

Optionally, the system may be configured to receive the coolant through the intake port along an inlet axis, and the system may be configured to exhaust the coolant through the exhaust port along an outlet axis, the inlet axis and the outlet axis being spaced apart from each other along a plane that is perpendicular to the first direction.

Optionally, the inlet axis and the outlet axis may be parallel to each other.

Optionally, the system may have a plurality of inlet axes that are disposed radially around the outlet axis.

In some aspects, the intake port and the exhaust port may be on a same face of the housing. Optionally, the intake port and the exhaust port may be on the first face of the housing.

In some aspects, the means for moving the coolant may include a turbine.

Optionally, the means for moving the coolant may include a pump.

In some aspects, the intake port may be disposed on a different face of the housing than the exhaust port.

In some aspects, the coolant may be moved into the system through the intake port at a flow rate of up to 10 cubic meters per second. Optionally, the coolant may be moved at a flow rate of up to 5 cubic meters per second. Optionally, the coolant may be moved at a flow rate of up to 3 cubic meters per second.

In some aspects, the flow rate of the coolant entering the system at the intake port may be different from a flow rate of the coolant being moved to the cooling chamber. Optionally, the flow rate of the coolant entering the system at the intake port may be greater than the flow rate of the coolant being moved to the cooling chamber.

In some aspects, the flow rate of the coolant being moved to the cooling chamber may be controlled by the control means.

In some aspects, the system may include one or more sensors therein. The one or more sensors may be configured to detect a parameter of the system. In some aspects, the sensors may be configured to detect the temperature of the fuel cells and/or the fuel cell stack, the temperature of the coolant entering the system, the temperature of the coolant after the coolant has passed out of the cooling chamber, the pressure of the coolant, the flow rate of the coolant, the composition of the coolant, the velocity of the coolant as it is exhausted out of the exhaust port, or another parameter of the coolant or the fuel cell stack.

Optionally, in some aspects, the housing of the system may include a curved surface disposed on the interior surface. The curved surface may extend into the cooling chamber. The curved surface may have a predetermined shape. In some aspects, the curved surface may be configured to receive the coolant and to impart a Coanda effect on the coolant such that the coolant is directed throughout the cooling chamber according to a predetermined distribution pattern. The predetermined distribution pattern may be a function of a fuel cell stack within the cooling chamber. In some aspects, the predetermined distribution pattern may depend on the size or shape of the fuel cell stack, on the distance between the fuel cell stack and the curved surface, the number of fuel cells within the fuel cell stack, the number of fuel cell stacks in the system, the relative arrangement of each fuel cell stack, the material of the curved surface, the texture of the curved surface that contacts the coolant, the velocity of the coolant flow through the system, the makeup of the coolant, the temperature of the fuel cell stack, the desired temperature of the fuel cell stack, the desired application of the system, any combination of the above parameters, and/or any other suitable parameter that can affect the need for distribution of coolant.

According to another aspect of the disclosure, a fuel cell system includes a fuel cell stack having one or more fuel cells therein; and a duct system for cooling fuel cells via a coolant fluid.

The duct system may be any one or more of the duct systems described above or may be a combination of embodiments described herein. The duct system may include none, one, or a plurality of optional aspects described herein.

In some aspects, the fuel cell system may be configured to provide power to a machine handling equipment (MHE) component. Optionally, the MHE component may be a forklift.

In some aspects, the fuel cell system may be configured to provide power to an unmanned aerial vehicles (UAVs). Optionally, the UAV may be a drone.

According to another aspect of the disclosure, a control system is disclosed for directing coolant through a duct system according to any of the aspects described throughout this application. The duct system may be any one or more of the duct systems described above or may be a combination of embodiments described herein. The duct system may include none, one, or a plurality of optional aspects described herein.

The control system may include a processor; a power source; and a sensor. The control system is configured to send an operation signal to the duct system to cause the duct system to operate.

In some aspects, the control system may be configured to communicate with a plurality of sensors. The sensors may be disposed in or on the duct system.

Optionally, the control system may be configured to operate based on a program. The program may provide the control system with instructions for operation, which the control system may use to operate the duct system and/or the fuel cell system. Optionally, the control system may be operated by a user. The user may send one or more signals to the control system and/or to the duct system to operate the systems. Optionally, the control system may be configured to operate autonomously in response to the parameters sensed by the one or more sensors.

A fuel cell system including a housing; a chamber within the housing; a fuel cell stack within the chamber and having a first face for receiving a coolant fluid and a second face, opposite and spaced apart from the first face, for the exit of the coolant fluid from the stack; an intake port configured to receive the coolant fluid into the chamber; an exhaust port configured to expel the coolant fluid from the chamber; a means for moving the coolant into, through, and out of the chamber; and a means for directing the coolant fluid to the first face of the fuel cell stack, wherein the housing includes a curved surface located within the chamber and the curved surface is configured to change the direction of at least a portion of the coolant fluid flowing towards the first face of the fuel cell stack.

BRIEF DESCRIPTION OF THE DRAWINGS

The present application is further understood when read in conjunction with the appended drawings. For the purpose of illustrating the subject matter, there are shown in the drawings exemplary aspects of the subject matter; however, the presently disclosed subject matter is not limited to the specific methods, devices, and systems disclosed. In the drawings.

Aspects of the disclosure will now be described in detail with reference to the drawings, wherein like reference numbers refer to like elements throughout, unless specified otherwise

DETAILED DESCRIPTION OF ILLUSTRATIVE EMBODIMENTS

Figure 1:
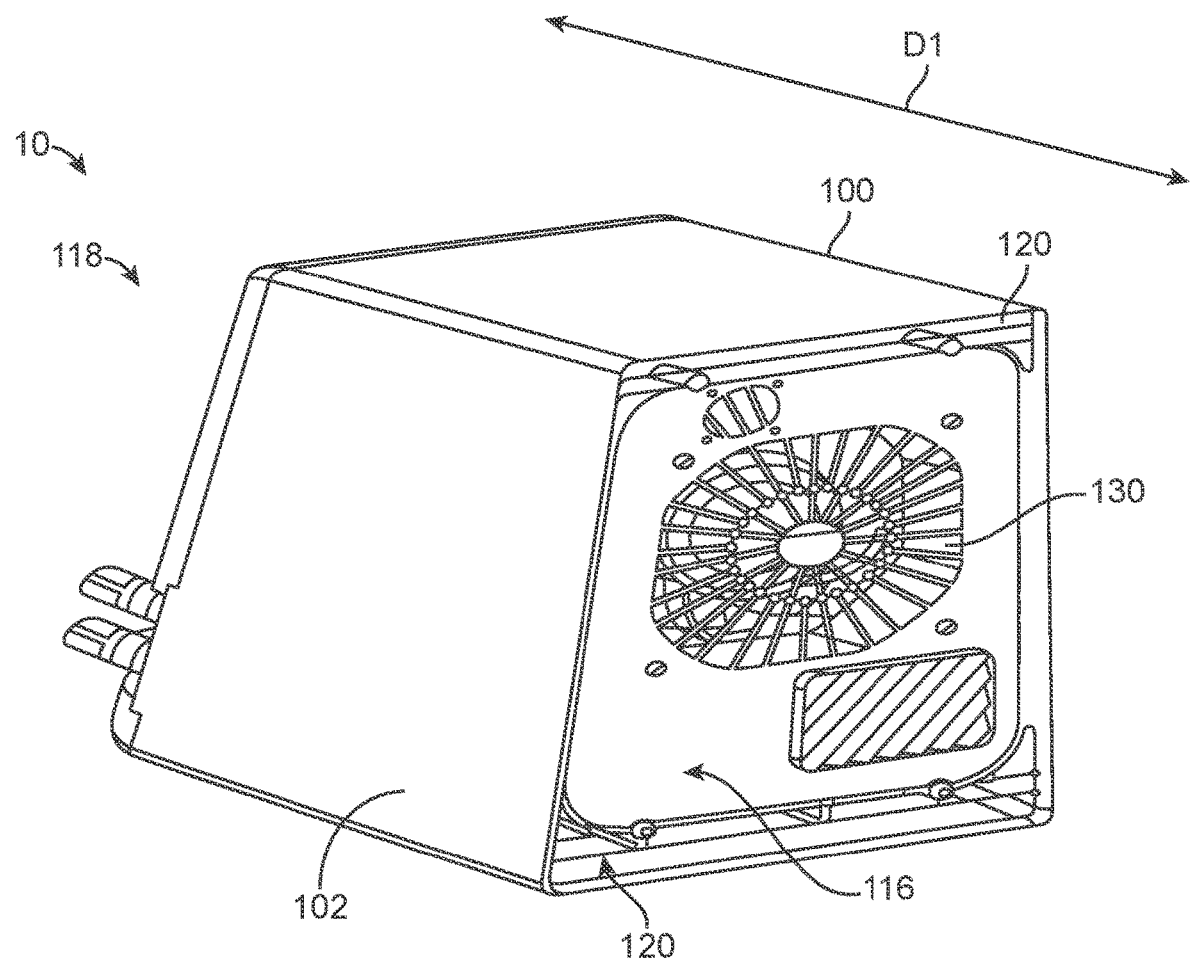
FIG. 1 illustrates an isometric perspective view of a system according to an aspect of this disclosure.
Figure 2:
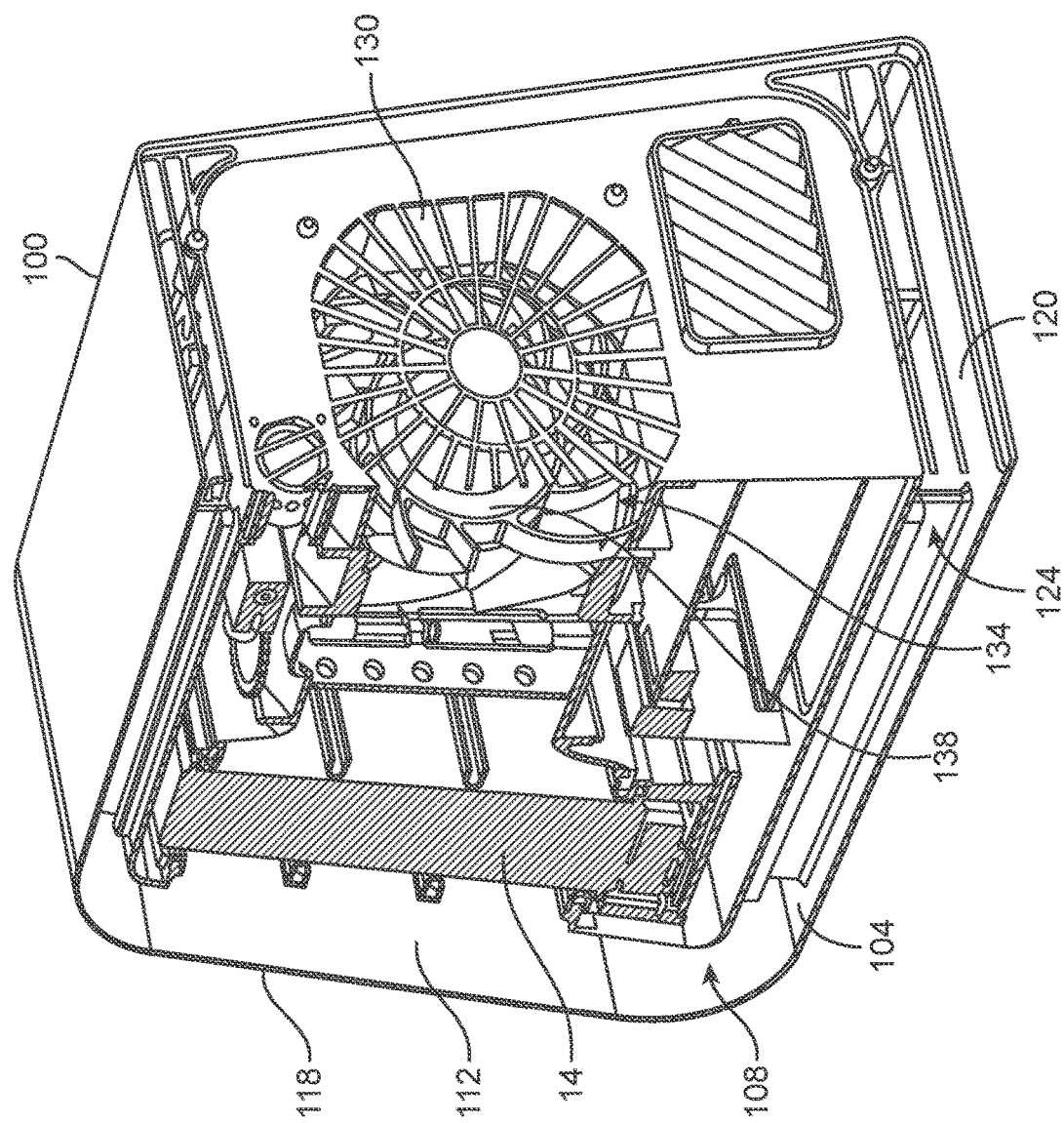
FIG. 2 illustrates an isometric cross-sectional view of the system of FIG. 1.
Figure 3:
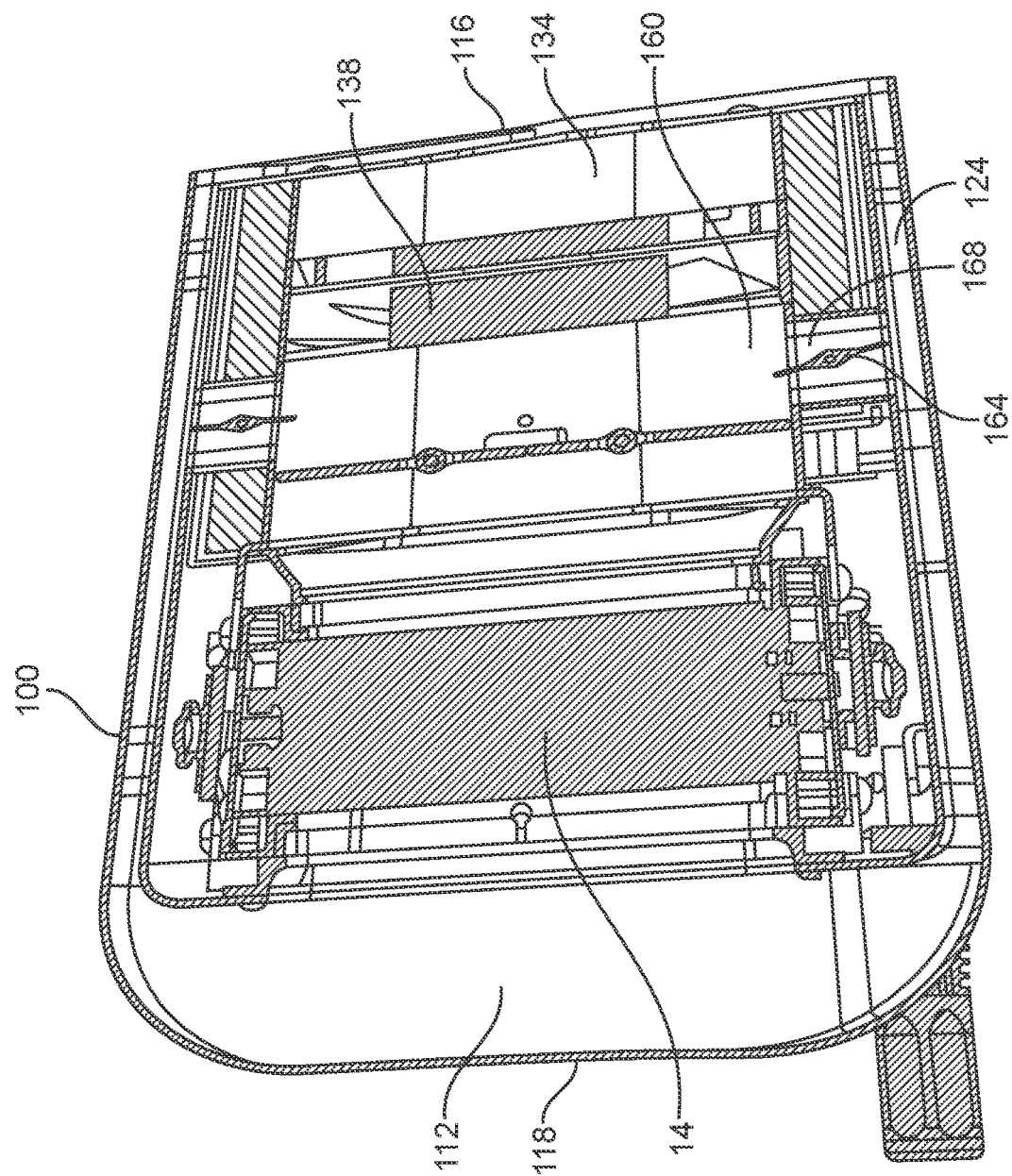
FIG. 3 illustrates a top plan cross-sectional view of the system of FIGS. 1 and 2.
Figure 4:
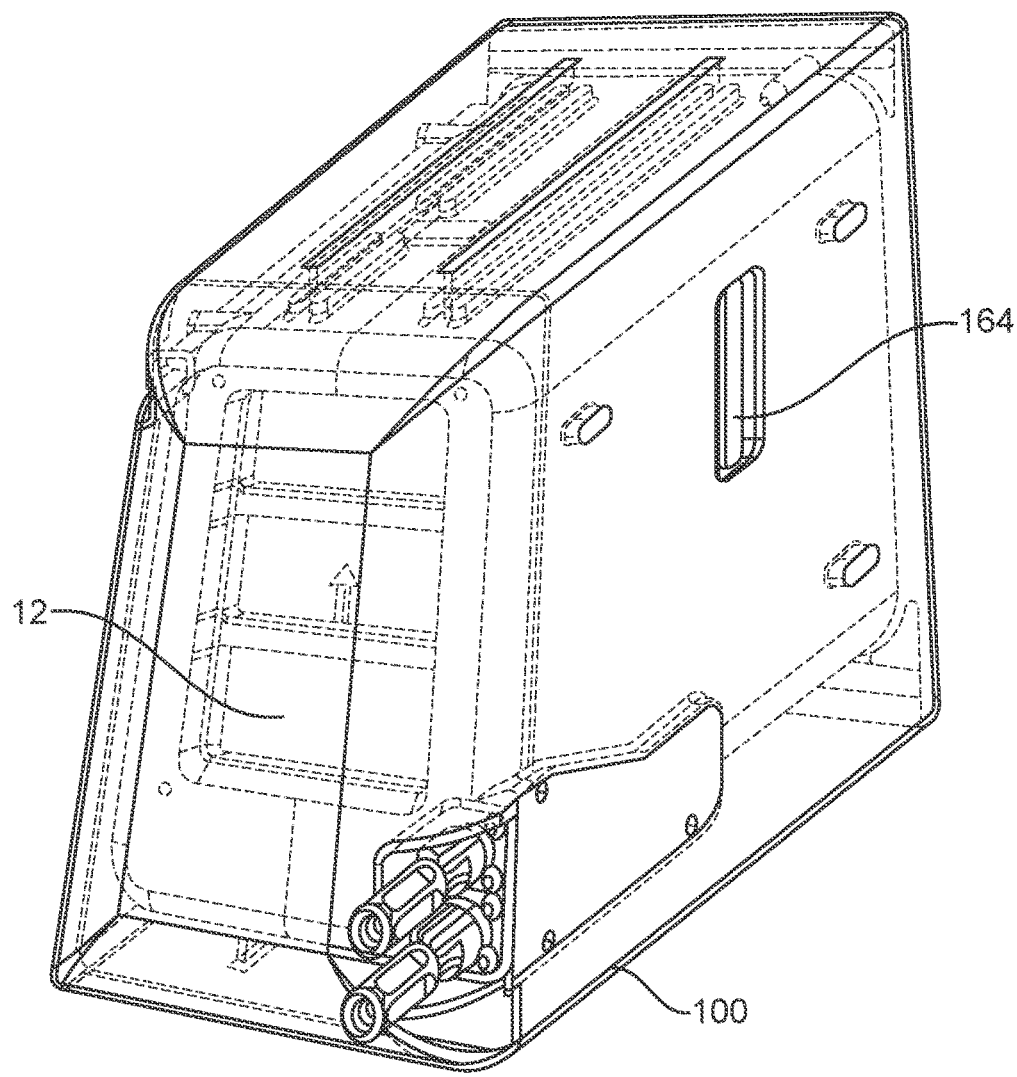
FIG. 4 illustrates another isometric perspective view of the system of FIGS. 1-3.

A target of this invention is to reduce the volume of fuel cell systems while increasing their ability to be implemented in various applications where the exhausting of gases from the rear of the unit is not a viable option. Furthermore, this invention means there is only one face that must not be obstructed. This in turn means that several units could be arranged back to back or side to side for larger applications.

Another target of this invention is to allow for accurate and precise control of cooling and/or hydration gas that enters the system to be supplied to the fuel cell stack. Inaccurate amounts of gas could lead to overheating or overcooling of the fuel cell stack.

Aspects of the disclosure will now be described in detail with reference to the drawings, wherein like reference numbers refer to like elements throughout, unless specified otherwise. Certain terminology is used in the following description for convenience only and is not limiting.

Certain terminology is used in the description for convenience only and is not limiting. The words "proximal" and "distal" generally refer to positions or directions toward and away from, respectively, an individual using the mixing system. The words "axial", "vertical", "transverse", "left", "right", "above," and "below" designate directions in the drawings to which reference is made. The term "substantially" is intended to mean considerable in extent or largely but not necessarily wholly that which is specified. The terminology includes the above-listed words, derivatives thereof and words of similar import.

The term "plurality," as used herein, means more than one. The singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of."

Referring to FIGS. 1-4, a system 10 is depicted. Throughout the application, the system may be referred to as a "unit" or "device", and it will be appreciated that these terms can be used interchangeably. The system 10 includes a housing 100, which has an exterior surface 102 and an interior surface 104 opposite the exterior surface 102. The housing 100 may be shaped substantially like a rectangular prism, a cube, a trapezoidal prism, a parallelepiped, or another polyhedron. In some instances, the housing 100 may be dimensioned and shaped such that it can be placed adjacent to or on top of another housing 100 (i.e. stacked).

The interior surface 104 defines an interior volume 108. The system 10 includes one or more fuel cells 12. It will be understood that the fuel cells 12 may be arranged together to form a fuel cell stack 14 according to known techniques. The fuel cell stack 14 is affixed to the housing 100. The fuel cell stack 14 may be removably affixed, such that the fuel cell stack 14 can be disconnected and removed from the system 10 and, optionally, another fuel cell stack 14 may be introduced into and connected to the housing 100.

The system 10 may include a plurality of fuel cell stacks 14 within the interior volume 108. The fuel cell stacks 14 may include the same quantities, types, and arrangements of fuel cells 12 or, alternatively, the fuel cell quantity, type, and/or arrangement may differ between fuel cell stacks 14. The system 10 may include 1, 2, 3, . . . 10, or another suitable number of fuel cell stacks 14, and this disclosure is not limited to the specific quantity of fuel cell stacks 14.

The interior volume 108 of the housing 100 further defines a cooling chamber 112. The fuel cell stack 14 (or the plurality of fuel cell stacks 14) is disposed at least partly within the cooling chamber 112. The cooling chamber 112 is configured to receive coolant to cool the fuel cells 12 within the one or more fuel cell stacks 14. In exemplary aspects of this disclosure, the coolant is a gas, for example ambient air, but it will be appreciated that fuel cells 12 may be cooled with a liquid instead. The cooling chamber 112 is dimensioned such that the coolant can flow in, therethrough, and out while passing by and contacting the fuel cell stack 14.

The housing 100 defines an intake port 120 through which coolant (e.g. air) can be introduced into the system and, specifically, into the cooling chamber 112. An intake channel 124 extends within the housing, for example within the interior volume 108, between the intake port 120 and the cooling chamber 112. The intake channel 124 fluidly communicates with the intake port 120 and the cooling chamber 112. The intake channel 124 is configured to receive the coolant at the intake port 120 and to allow the coolant to move through the intake channel 124 to the cooling chamber 112.

The housing 100 further defines an exhaust port 130 through which the coolant can be discharged. An exhaust channel 134 extends within the housing, for example within the interior volume 108, between the cooling chamber 112 and the exhaust port 130. The exhaust channel 134 fluidly communicates with the cooling chamber 112 and the exhaust port 130. The exhaust channel 134 is configured to receive the coolant from the cooling chamber 112 and allow the coolant to move through the exhaust channel 134 to the exhaust port 130, from which the coolant is expelled from the system 10.

The housing 100 defines a first face 116 on the exterior surface 102. For purposes of this disclosure, a "face" of the housing 100 may be any geometric face of the shape of the system described above. In some embodiments, the intake port 120 may be defined on the first face 116. Optionally, the exhaust port 130 may be defined on the first face 116. In some embodiments, both the intake port 120 and the exhaust port 130 may be defined on the same first face 116.

Referring to the figures, the depicted embodiment has the intake port 120 and the exhaust port 130 on the same face, i.e. on the first face 116. It will be appreciated that the intake port 120 and the exhaust port 130 do not have to be on the same face of the housing 100.

The housing defines a second face 118 spaced away from the first face 116 along a first direction D1. For purposes of this disclosure, the first direction D1 includes the direction from the first face 116 to the second face 118 and the reverse direction from the second face 118 to the first face 116. The second face 118 may be a different geometric face of the housing shape as described above. The cooling chamber 112 may be disposed within the interior volume 108 between the first face 116 and the second face 118. It will be appreciated that the housing 100 includes other faces that make up the geometric shape of the housing 100 as described above.

The coolant (e.g. air) may enter the intake port 120 at the first face 116 and move into the intake channel 124. The coolant may move from the intake port 120 towards the cooling chamber 112, for example, along the first direction D1. From the cooling chamber 112, the coolant may be discharged into the exhaust channel 134 and moved towards and through the exhaust port 130. In some embodiments, the coolant may move along the exhaust channel 134 along the first direction D1. Optionally, the coolant may be moved along the exhaust channel 134 parallel to the movement of the coolant along the intake channel 124. Alternatively, the intake channel 124 and the exhaust channel 134 may be arranged such that the flow of coolant along one of the intake and exhaust channels 124, 134 is not parallel to the flow of coolant along the other of the intake and exhaust channels 124, 134.

In some aspects, the system 10 may include a plurality of intake ports 120, a plurality of exhaust ports 130, or a plurality of both intake and exhaust ports 120, 130. Each intake port 120 may open to and fluidly communicate with a separate intake channel 124, and so the system 10 may include a plurality of intake channels 124, such that, for example, the quantity of intake channels 124 corresponds to the quantity of intake ports 120. Each exhaust port 130 may open to and fluidly communication with a separate exhaust channel 134, and so the system 10 may include a plurality of exhaust channels 134, such that, for example, the quantity of exhaust channels 134 corresponds to the quantity of exhaust ports 130. Any suitable quantity of intake ports 120 and their respective intake channels 124 may be utilized, for example, 1, 2, 3, 4, 5, 6, 7, 8, or another suitable number. Similarly, any suitable number of exhaust ports 130 and their respective exhaust channels 134 may be utilized, such as 1, 2, 3, 4, 5, 6, 7, 8, or another suitable number.

Referring to the exemplary embodiment of FIGS. 1-4, the system 10 may include a plurality of intake ports 120 (and respective intake channels 124) and a single exhaust port 130 (and respective exhaust channel 134). It will be appreciated that a different number of intake ports 120 and exhaust ports 130 (and their respective channels 124, 134) can be utilized, and the depicted embodiment in the figures is not intended to be limited. In some specific embodiments, the system 10 may include two intake ports 120. All intake and exhaust ports 120, 130 may be disposed on the first face 116. As shown in the figures, the exhaust port 130 may arranged on the first face 116 such that the intake ports 120 surround the exhaust port 130. The exhaust port 130 may be disposed between the two intake ports 120.

In some exemplary embodiments, the system 10 may include four intake ports 120 and a single exhaust port 130. A suitable arrangement in such embodiments could include, for example, the exhaust port 130 being surrounded by the four intake ports 120.

An arrangement as depicted in the figures where the intake ports 120 and the exhaust port 130 are on the same face of the housing 100 allows for the housing 100 to be covered or otherwise obstructed on all but the one face (e.g. first face 116) that is open to coolant (e.g. air) for both intake and exhaust. This permits the system 10 to be disposed in densely packed arrangements, where other components may surround the system 10. Such arrangements also allow for stacking of the systems 10 in embodiments where a plurality of systems 10 can be arranged together.

The system further includes a means for moving the coolant into, through, and out of the system. In some aspects, the means may include an impeller or a fan 138. The impeller 138 may be disposed on the housing 100. In some aspects, the impeller 138 may be disposed on the exterior surface 102 of the housing 100. In some aspects, the impeller 138 may be disposed on the interior surface 104 of the housing 100. The impeller 138 may be disposed in the interior volume 108 and may be connected to the housing 100.

Referring to the embodiments depicted in FIGS. 1-4, the impeller 138 may be disposed adjacent to or in the exhaust channel 134. Optionally, the impeller 138 may be disposed adjacent to the exhaust port 130. The impeller 138 may be arranged such that when it rotates, coolant is moved through the exhaust channel 134 and towards the exhaust port 130.

In such embodiments, the impeller 138 (or alternative or additional means for moving coolant) may be disposed downstream of the cooling chamber 112. In some embodiments, a plurality of means for moving the coolant may be included in the system 10, for example, a plurality of impellers or fans 138. The impellers 138 may be arranged throughout the system 10, for example, such that one or more impellers 138 are upstream of the cooling chamber 112, one or more impellers 138 are downstream of the cooling chamber 112, one or more impellers 138 are within the cooling chamber 112, or a combination of any of the above, where one or more impellers 138 may be arranged upstream, downstream, or within the cooling chamber 112.

It will be appreciated that the impeller 138 or another means for moving coolant may be disposed within or adjacent to the intake channel 124. Optionally, the means may be disposed adjacent to the intake port 120.

It will further be understood that the means for moving coolant will be sufficiently powered, for example by a power source, such that the desired amount of coolant can be moved through the system 10. In some aspects, the desired amounts of coolant being moved through the system 10, characterized as flow rate, can be up to 3 cubic meters per second, up to 5 cubic meters per second, up to 10 cubic meters per second, or another suitable flow rate. The dimensions, placement, number, power need, and other parameters of the means for moving the coolant will depend on the specific use of the system 10 and the desired quantities and flow rates of coolant to be moved.

Alternative embodiments are depicted in FIGS. 6-11. It will be understood that the different embodiments shown are not limiting, and each embodiment may include one or more overlapping elements. Like elements are referred to and labeled with like reference numerals, and the description of each element can be applicable to any of the disclosed embodiments alike unless described otherwise.

In operation, the means for moving coolant (e.g. the impeller 138) is actuated to cause coolant (e.g. air) to be moved into the system 10 through the one or more intake ports 120. The coolant is then moved into and through the one or more intake channels 124 and into the cooling chamber 112. The coolant in the cooling chamber 112 passes by and/or contacts the one or more fuel cell stacks 14. The interaction of the coolant and the fuel cell stacks 14 causes heat exchange to occur, for example, heat radiating from the fuel cell stack 14 is drawn from the fuel cell stack 14 into the stream of coolant passing through the cooling chamber 112, thus cooling the fuel cell stack 14 and the fuel cells 12 therein.

It will be appreciated that an alternative, opposite arrangement from what is described above may exist, where the coolant fluid is warmer than the fuel cell stack 14 (or warmer than another component in the system 10), and the thermal energy of the coolant passing through the system 10 may be drawn onto the fuel cell stack 14 (or another component), thus warming the stack 14 (or other component). Such an arrangement may be beneficial if it is desired to raise or maintain a specific setpoint temperature of the fuel cells 12 or the fuel cell stack 14.

From the cooling chamber 112, the coolant is moved into the exhaust channel 134. The coolant moves through the exhaust channel 134 towards and through the exhaust port 130. As depicted in the figures, the exhaust port 130 may be disposed on the same first face 116 as the intake port 120 (or the plurality of intake ports 120). As such, the coolant enters and exits the system 10 at the same face of the housing 100 (e.g. at the first face 116).

In some aspects, it may be advantageous to minimize recirculation of coolant fluid. That is, it may be beneficial to decrease the amount of coolant that exits the system 10 through the exhaust port 130 from entering the system 10 again through the intake port 120 on the same first face 116.

Figure 5:
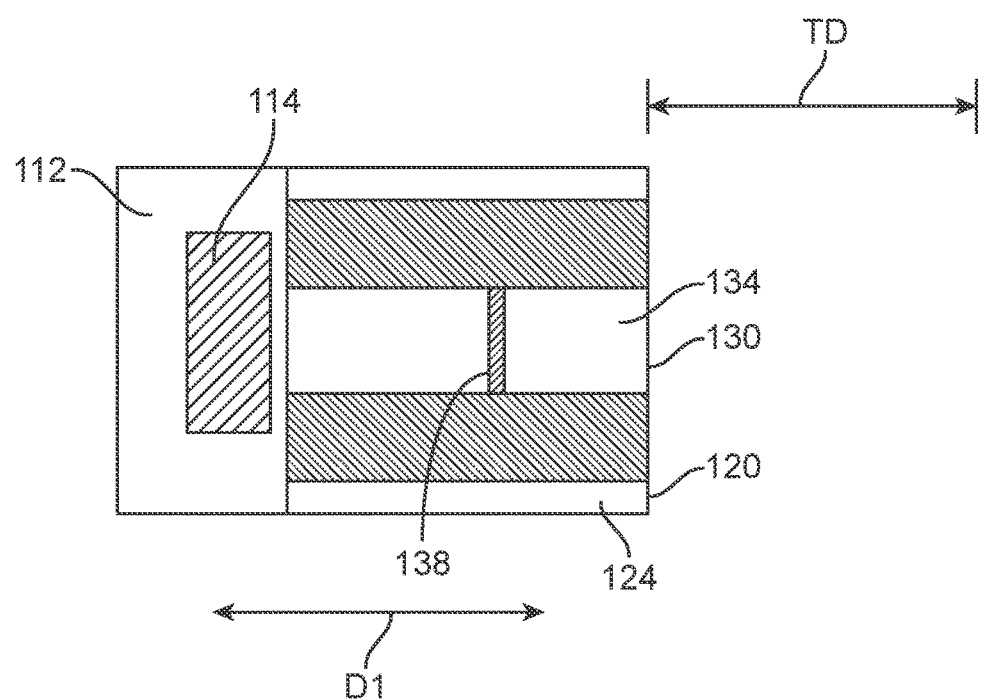
FIG. 5 illustrates a schematic representation of a system according to an aspect of the disclosure.
Figure 6:
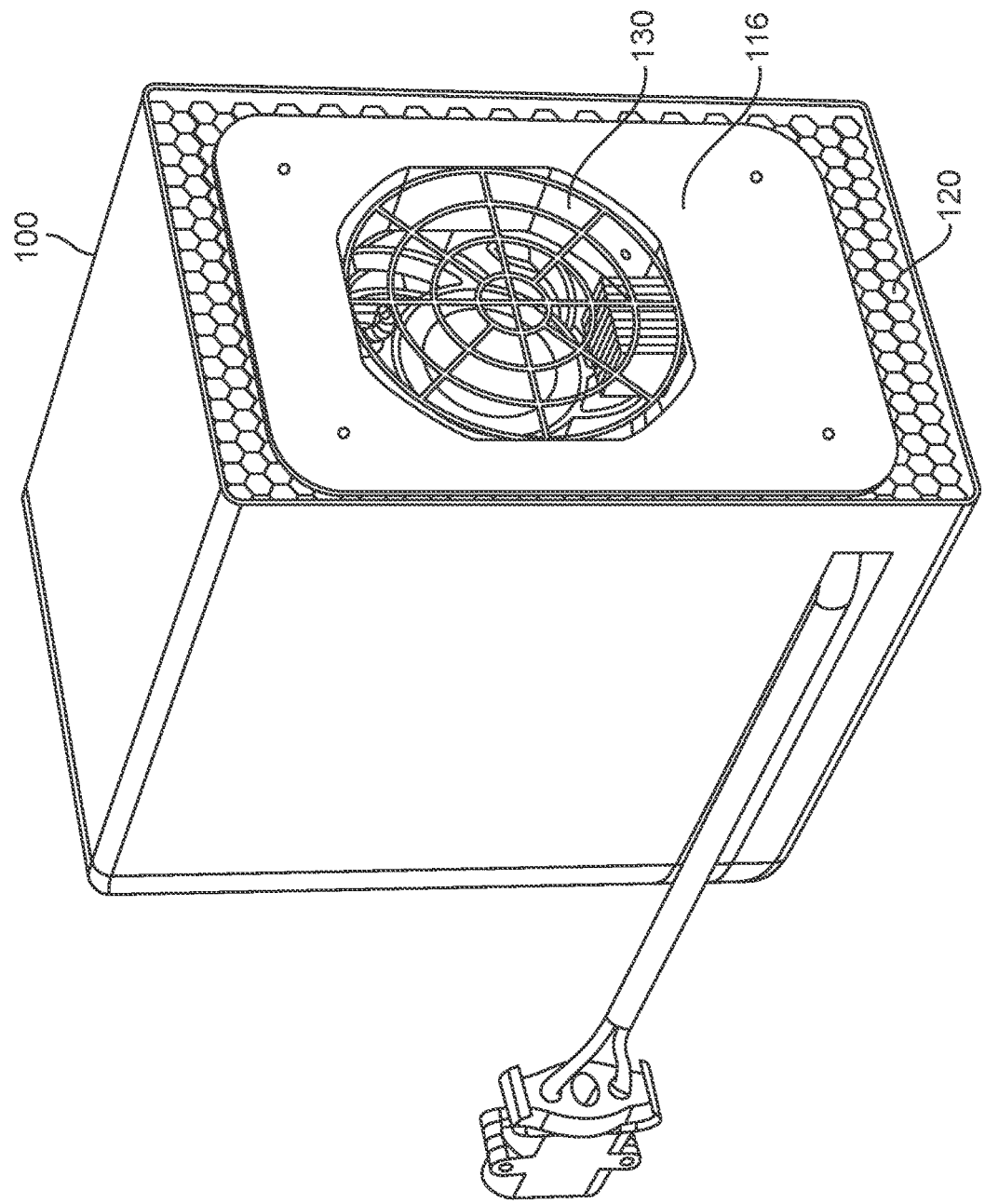
FIG. 6 illustrates an isometric perspective view of a system according to another aspect of the disclosure.
Figure 7:
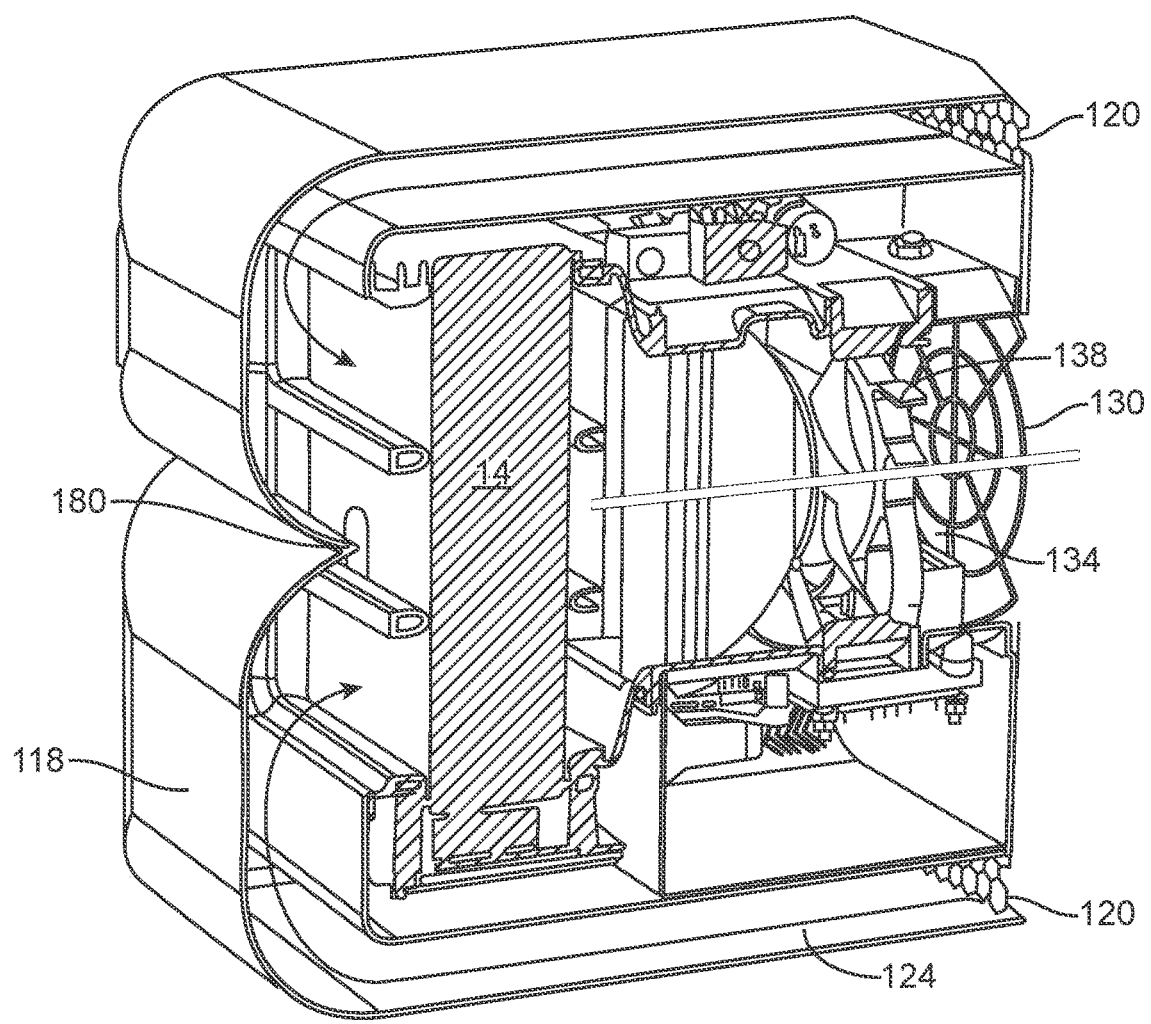
FIG. 7 illustrates a side perspective cross-sectional view of the system of FIG. 6.

In some embodiments, this effect is modulated by exhausting coolant out at a velocity that is great enough to propel the coolant past a threshold distance TD (see schematic representation in FIG. 5). At or beyond this threshold distance TD, the exhausted coolant disperses into the environment and mixes with the ambient gases. Once the coolant is expelled to or beyond the threshold distance TD, a small, acceptable amount or percentage of the exhausted coolant would be subject to suction of the intake port 120. It will be appreciated that the exact threshold distance TD can be calculated based on the amount or percentage of recirculating coolant that is deemed acceptable based on the desired use of the system 10. The expulsion of the coolant through the exhaust port 130 may be controlled by the dimensions and structure of the impeller 138, the power capabilities of the impeller 138, by the rotational speed of the impeller 138, by the size of the exhaust port 130, by the size and/or quantity of the intake port(s) 120, by the respective distances between the exhaust port 130 and the intake port(s) 120, the expected temperature of the coolant, the composition of the coolant, or by other factors.

In some aspects, to further limit recirculation, the housing 100 may include one or more structures 142 for directing coolant into the intake port 120 and/or directing coolant out of the exhaust port 130. The structures 142 may include fins, baffles, ledges, overhangs, grates, or other protrusions extending from the housing 100 to result in less mixing (relative to not having the structures 142) of coolant that has been exhausted from the system 10 and coolant that is being taken into the system 10. The one or more structures 142 may be disposed on the first face 116 or on another face of the housing 100. The structure 142 may be disposed adjacent to and/or within the intake port 120, the exhaust port 130, or both.

In some exemplary aspects, operation of the system 10 may advantageously benefit from increased heating of one or more components therein. In such scenarios, recirculation of the exhausted coolant (which has absorbed heat after passing through the cooling chamber 112) may be preferable. In such aspects, the system 10 may include a closure mechanism (not shown) such as a door that prevents coolant that is moved out of the exhaust port 130 from moving to and beyond the threshold distance described above. As such, a greater percentage of exhausted coolant is moved back into the system 10 through the intake port 120 (relative to the percentage being recirculated without the closure mechanism). It will be understood that the closure mechanism may be a discrete component of the system 10 (for example a part of the housing 100) or, alternatively, the closure mechanism may be a different component (for example, another system 10) placed in close proximity to the exhaust port 130 so as to function as described above.

As the coolant is moved into and through the cooling chamber 112, some portions of the fuel cell stack 14 may not be adequately cooled. In some instances, the flow of coolant may be unevenly distributed across the fuel cell stack 14, which can lead to inconsistent energy use, damage to fuel cells, loss of efficiency, or other problems. In some embodiments, one or more physical components may be present in or adjacent to the cooling chamber 112 to even out the coolant flow. As shown in the exemplary non-limiting embodiment of FIG. 7, a ridge 180 may be disposed on the housing 100 to help direct the flow of coolant within the cooling chamber 112. It will be appreciated that other components, or a plurality of components, may be utilized to direct coolant flow to anticipated zones in the cooling chamber 112 that are expected to receive uneven cooling (referred to as "dead" zones).

Figure 11:
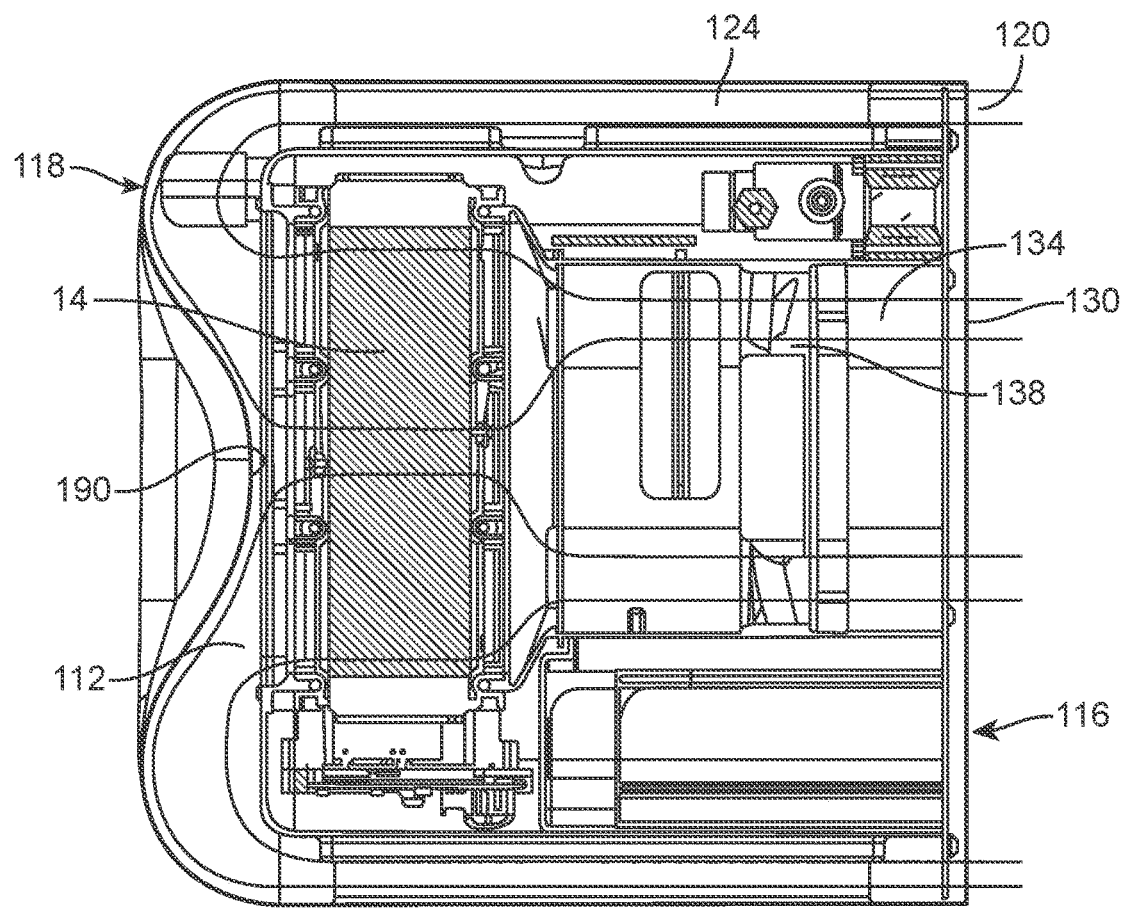
FIG. 11 illustrates a top plan cross-sectional view of another aspect of the disclosure showing a curved structure for imparting a Coanda effect.

Optionally, either in addition to or instead of the components described above, the housing 100 may include a curved surface 190 configured to provide a Coanda (Coandă) effect to the coolant as it moves into and through the cooling chamber 112. With sufficient structure, the Coanda effect will cause the stream of coolant to follow a flat or curved surface. Such an arrangement will help even out the coolant flow so that coolant is evenly distributed as it contacts and moves past the fuel cell stack 14. An exemplary embodiment showing an exemplary curved surface 190 is depicted in FIG. 11. The curved surface 190 may be disposed on the interior surface 104 of the housing 100 and may protrude into the cooling chamber 112. In such an embodiment, as the flow of coolant moves through the intake passage 124 to the cooling chamber 112, the flow of coolant contacts the curved surface 190 and follows the curve. The curved surface 190 helps to direct the coolant flow to the desired areas within the cooling chamber 112, for example, to the fuel cell stack 14. This arrangement may be advantageous in scenarios where the fuel cell stack 14 is not receiving even coolant flow. By directing the coolant flow to flow according to the Coanda effect via the curved surface 190, the fuel cell stack 14 may be evenly and sufficiently exposed to the flow of the coolant.

The curved surface 190 may have a predetermined shape. The shape may be curved according to a mathematical function. It will be appreciated that the predetermined shape may depend on one or more parameters of the system, such as any parameters described throughout this application.

The curved surface 190 may be configured to receive the coolant and to impart a Coanda effect on the coolant such that the coolant is directed throughout the cooling chamber 112 according to a predetermined distribution pattern. The predetermined distribution pattern may be a function of a fuel cell stack within the cooling chamber. In some aspects, the predetermined distribution pattern may depend on the size or shape of the fuel cell stack, on the distance between the fuel cell stack and the curved surface, the number of fuel cells within the fuel cell stack, the number of fuel cell stacks in the system, the relative arrangement of each fuel cell stack, the material of the curved surface, the texture of the curved surface that contacts the coolant, the velocity of the coolant flow through the system, the makeup of the coolant, the temperature of the fuel cell stack, the desired temperature of the fuel cell stack, the desired application of the system, any combination of the above parameters, and/or any other suitable parameter that can affect the need for distribution of coolant.

In some aspects, the quantity and/or flow rate of the coolant through the system 10 may be modulated based on the specific need. While the amount of coolant drawn into and moved through the system 10 can be controlled by controlling the fan parameters (e.g. rotational speed of the fan), it may be advantageous to adjust how much coolant is moved to the cooling chamber 112 without changing fan parameters. This can increase the lifespan of the fan, as well as decrease difficulty in calculating the desired parameters and adjusting the fan to those parameters. In some aspects, covering or otherwise inhibiting the exhaust port 130 incurs greater pressure drop. Blocking the exhaust port 130 may negatively impact the forceful jetting of the coolant out of the system 10 and may preclude the necessary amount of the exhausted fluid from reaching the distance threshold described above. So, in some aspects of this disclosure, it may not be advantageous to block the exhaust port 130, inhibit movement of the coolant out of the exhaust port 130 and to the predetermined threshold distance TD, or decrease the exhaust velocity of the coolant exiting the system 10 by decreasing the speed of the impeller 138. One way to maintain proper exhaustion of the coolant so that the coolant is exhausted to the threshold distance TD is to maintain the size and shape of the impeller 138, as well as its operational parameters. As such, it may be preferred to modulate how much coolant enters the cooling chamber 112 without adjusting operational parameters of the impeller 138.

In some exemplary aspects described throughout this application, the system 10 may include one or more control means 164 for controlling how much of the coolant that enters the intake port 120 is permitted to move into the cooling chamber 112. In some non-limiting aspects, the control means 164 may optionally be a valve. As further options, the valve may be a gate valve, a globe valve, a plug, a ball valve, a butterfly valve, or another suitable valve type. The valve may optionally be a solenoid valve that is configured to be controlled by a controller. In some aspects, the control means 164 may optionally be a louver.

The control means 164 may be configured to divide the coolant that enters the system 10 into two or more pathways. In some aspects, the first pathway may lead to the cooling chamber 112 (for example, via the intake channel 124). The second pathway may lead to a different chamber that is separate from the cooling chamber 112. In some aspects, the interior volume 108 of the housing 100 may define a bypass chamber 160 that is separate from the cooling chamber 112. The bypass chamber 160 may be in fluid communication with the exhaust channel 134. In some aspects, the bypass chamber 160 may be within the exhaust channel 134. In some aspects, the bypass chamber 160 may include a portion or the entirety of the exhaust channel 134. In some aspects, the bypass chamber 160 and the exhaust channel 134 may be the same volume.

The control means 164 may be configured to selectively direct the coolant that enters the system 10 to either the cooling chamber 112 or the bypass chamber 160. The control means 164 may be configured to have a first position (or first configuration), in which all coolant that enters the system 10 is directed to the cooling chamber 112, a second position (or second configuration), in which all coolant that enters the system 10 is directed to the bypass chamber 160, or a third position (or third configuration) that is between the first and second positions. It will be understood that there may be an infinite number of third positions between the first and second positions, in which a portion of the coolant that enters the system 10 is directed to the cooling chamber 112 and another portion of the coolant is directed to the bypass chamber 160.

The control means 164 may be disposed within or adjacent to the intake channel 124. In some aspects where the system 10 includes a plurality of intake channels 124, the system 10 may include a plurality of control means 164, for example, a control means 164 within each of the plurality of intake channels 124. Optionally, each intake channel 124 may include a plurality of control means 164. Further optionally, the system 10 may have one or more intake channels 124 that do not have any control means 164 and one or more intake channels 124 that have one or more control means 164.

Optionally, the control means 164 may be adjacent to an intermediate bypass channel 162 that extends between the intake channel 124 and the bypass chamber 160.

In some aspects, the control means 164 may be manually adjusted by a user, for example by moving the control means 164 into the first position, the second position, or any one of the infinite possible third positions. Optionally, the control means 164 may be adjusted by a controller. The adjustment may be done based on the desired amount of coolant and desired flow path of the coolant to enter the cooling chamber 112. In some aspects, the amount of coolant and/or the flow rate of the coolant that enters the system 10 may be modulated such that up to approximately 90% of the coolant that enters the system 10 is directed to the cooling chamber 112; such that up to approximately 80% is directed to the cooling chamber 112; such that up to approximately 70% is directed to the cooling chamber 112; such that up to approximately 60% is directed to the cooling chamber 112; such that up to approximately 50% is directed to the cooling chamber 112; such that up to approximately 40% is directed to the cooling chamber 112; such that up to approximately 30% is directed to the cooling chamber 112; such that up to approximately 20% is directed to the cooling chamber 112; such that up to approximately 10% is directed to the cooling chamber 112; or up to another suitable percentage. It will be understood that the desired distribution of coolant and/or flow rates of the coolant will depend on the intended use of the system 10, the fuel cell stack 14, the coolant type and parameters, and/or any other parameters of the system 10, the fuel cell components within the fuel cells 12, and the coolant properties.

In some aspects, such distribution of coolant may be useful in properly diluting the hydrogen within the fuel cell stack 14. Too much coolant may dilute the hydrogen beyond what is advantageous, and the efficiency of the system 10 may decrease.

Coolant that is diverted by the one or more control means 164 to the bypass chamber 160 is moved out of the system 10 through the one or more exhaust ports 130.

In some aspects of the disclosure, the system 10 may further include a control system for controlling operation of the system 10. In some non-limiting embodiments, the system 10 may include one or more sensors (not shown) for determining the flow rate of the coolant, the temperature of the coolant, the temperature of the fuel cell stack 14, the concentration of the hydrogen within the fuel cells 12, electrical current, or another parameter that is typically monitored in fuel cell systems. The system 10 may include a controller having a processor, memory, and input/output capabilities configured to control the components within the system, for example, the impeller 138, the fuel cell stack 14, and/or the control means 164. The controller may be configured to interact with an external device to display operational parameters of the system 10 and/or to receive inputted commands from a user. The controller may operate based on one or more programs, for example saved into the memory, that provide instruction for operation of the system 10 and/or the desired parameters of operation for the one or more components described throughout this application.

In some exemplary embodiments, one or more of the intake ports 120 and/or the exhaust ports 130 may be disposed on a face of the housing 100 that is different from the first face 116. Such arrangements may be utilized in applications where the system 10 is positioned such that at least one other face of the housing 100 is sufficiently open to the ambient environment to allow for intake and/or exhaust of the coolant. Such an arrangement may be advantageous to decrease prevalence of recirculation of coolant, as the exhaust port(s) 130 may be on different faces and/or angled away from the intake port(s) 120. In such exemplary arrangements, the placement of exhaust ports 130 and intake ports 120 may be such that: all exhaust ports 130 are on a different face of the housing 100 than all the intake ports 120; some exhaust ports 130 are on the same face of the housing 100 as some or all of the intake ports 120, while some exhaust ports 130 are on a different face of the housing 100 than the intake ports 120; or some intake ports 120 are on the same face of the housing 100 as some or all of the exhaust ports 130, while some intake ports 120 are on a different face of the housing 100 than the exhaust ports 130. As explained above, such arrangements are not always suitable in applications where the system 10 is placed in a densely packed area where only one face (e.g. the first face 116) is sufficiently open to the environment.

In some exemplary aspects, the housing 100 of the system 10 may be removable such that the intake of coolant occurs adjacent to the first face 116 and the exhaust of the coolant from the cooling chamber 112 occurs adjacent to the second face 118. It will be appreciated that the housing 100 may be shaped and dimensioned such that the intake ports 120 and/or the exhaust ports 130 are angled in a desired direction to facilitate intake and exhaust of the coolant, respectively.

Figure 8:
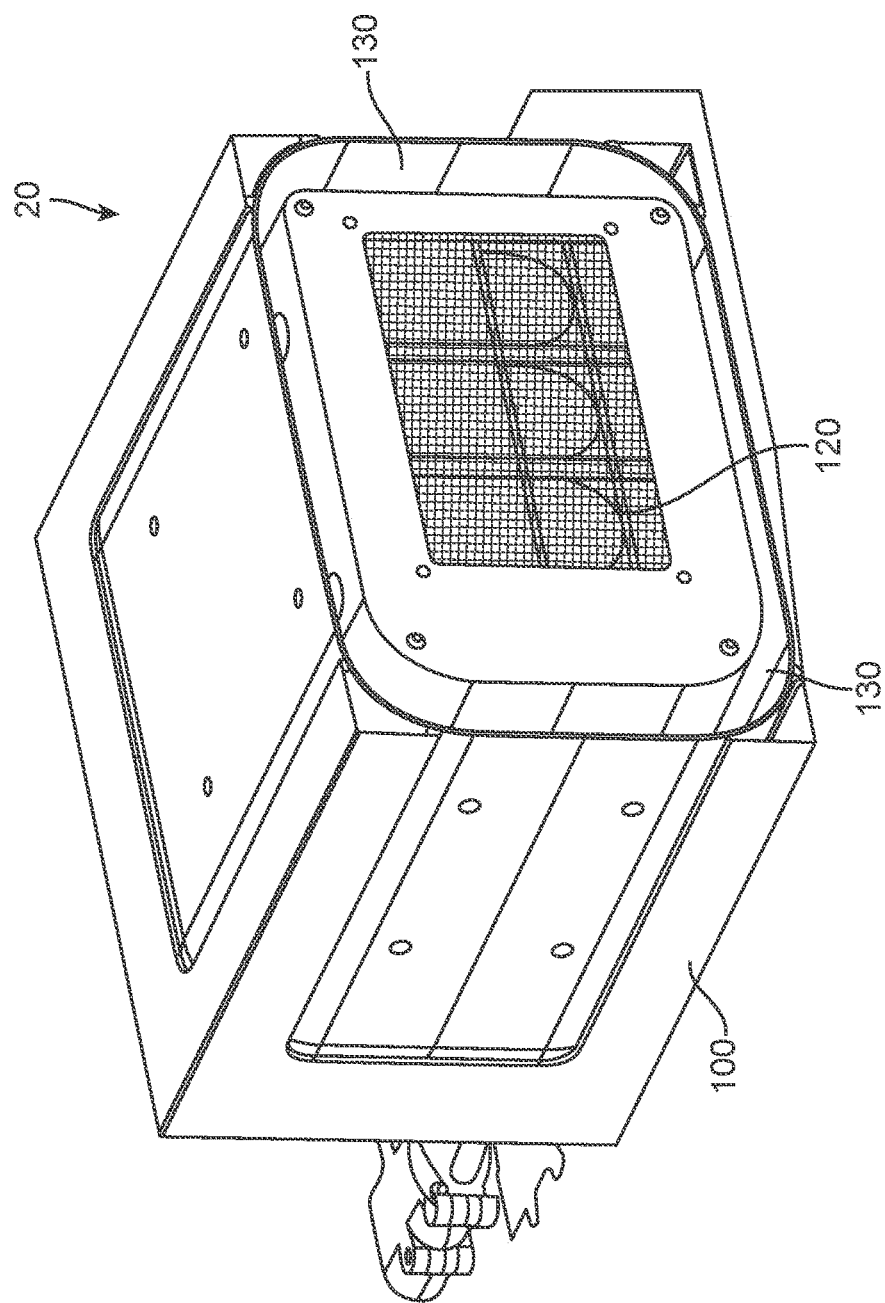
FIG. 8 illustrates an isometric perspective view of a system according to another aspect of the disclosure.
Figure 9:
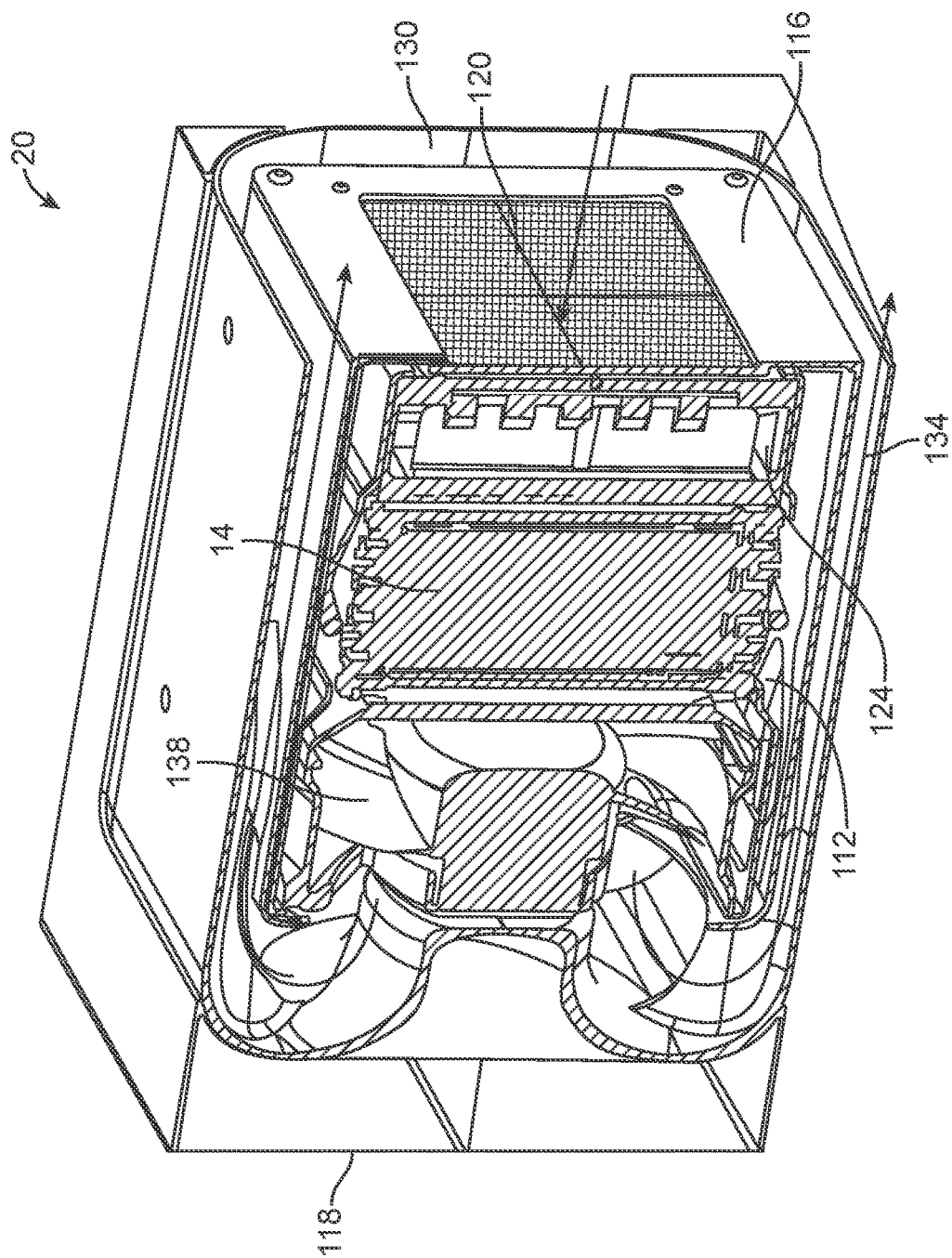
FIG. 9 illustrates a side perspective cross-sectional view of the system of FIG. 8.
Figure 10A:
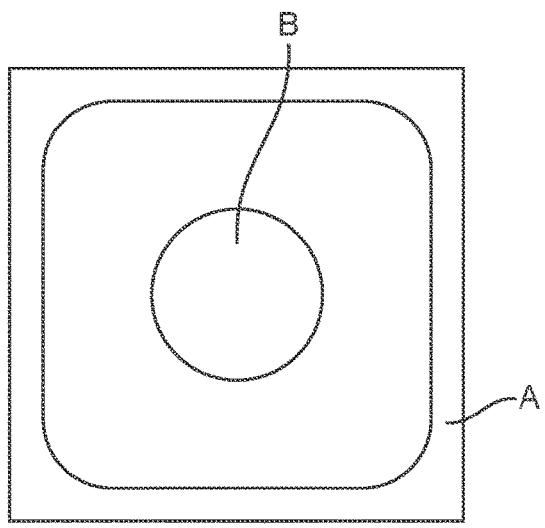
FIG. 10A illustrates a front perspective schematic view of an aspect of the disclosure.
Figure 10B:
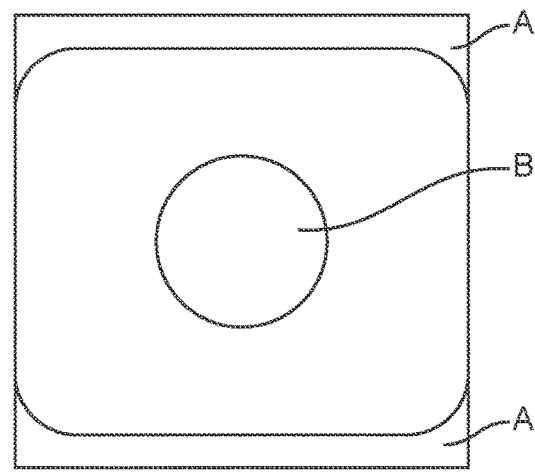
FIG. 10B illustrates a front perspective schematic view of another aspect of the disclosure.
Figure 10C:
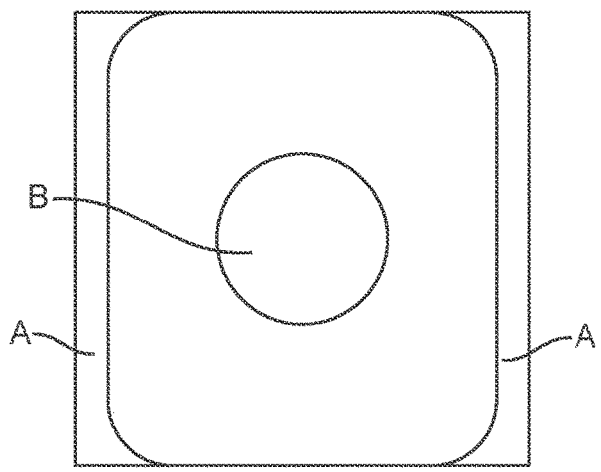
FIG. 10C illustrates a front perspective schematic view of another aspect of the disclosure.
Figure 10D:
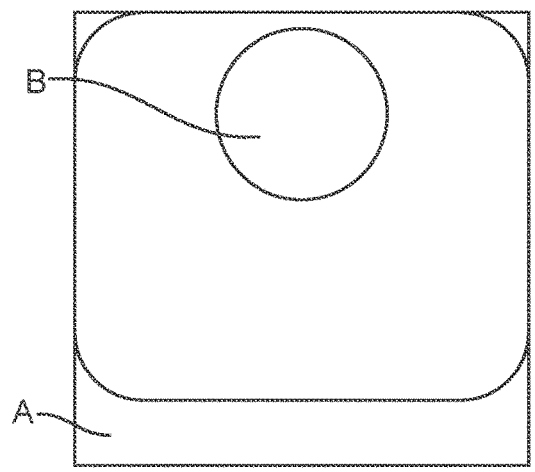
FIG. 10D illustrates a front perspective schematic view of another aspect of the disclosure.

Referring to the exemplary embodiment of FIGS. 8 and 9, an alternative system 20 is shown, where like numerals refer to like elements. Details regarding the system 10 described throughout this application may also apply to system 20 unless explicitly stated otherwise. It will be appreciated that different reference numerals are utilized to help distinguish between exemplary embodiments and are not intended to limit one or the other, and reference to one or the other may include both.

In the embodiment depicted in FIGS. 8 and 9, the system 20 includes an intake port 120 that is surrounding by a plurality of exhaust ports 130 disposed radially around the intake port 120. In operation of the system 20, the impeller 138 pulls coolant in through the intake port 120 and into the intake channel 124. The cooling chamber 112 may be adjacent or within the intake channel 124. The coolant passes into the cooling chamber 112 and contacts and flow around the fuel cell stack 14. The coolant is then moved into the one or more exhaust channels 134 that are in fluid communication with the cooling chamber 112. The coolant is moved through the one or more exhaust channels 134 and out of the exhaust ports 130. It will be appreciated that the system 20 may include any suitable number of intake ports 120 and respective intake channels 124, as well as any suitable number of exhaust ports 130 and respective exhaust channels 134.

The systems depicted throughout this application may have various arrangements of intake and exhaust ports 120, 130. Referring to FIGS. 10A-10D, several exemplary arrangements are depicted. It will be appreciated that other arrangements may be utilized, as well as modifications of the shown arrangements. In FIGS. 10A-10D, the type of port is symbolized by either "A" or "B" and can be either an intake port 120 or an exhaust port 130. According to some aspects, FIGS. 10A-10D should be interpreted where reference "A" refers to intake port 120 (or ports 120) and reference "B" refers to exhaust port 130 (or ports 130). In alternative embodiments, the FIGS. 10A-10D should be interpreted where reference "A" refers to exhaust port 130 (or ports 130) and reference "B" refers to intake port 120 (or ports 120). The shapes and dimensions of the depicted ports are not intended to be limiting, and it will be understood that different shapes and relative positions may be utilized.

Figure 13:
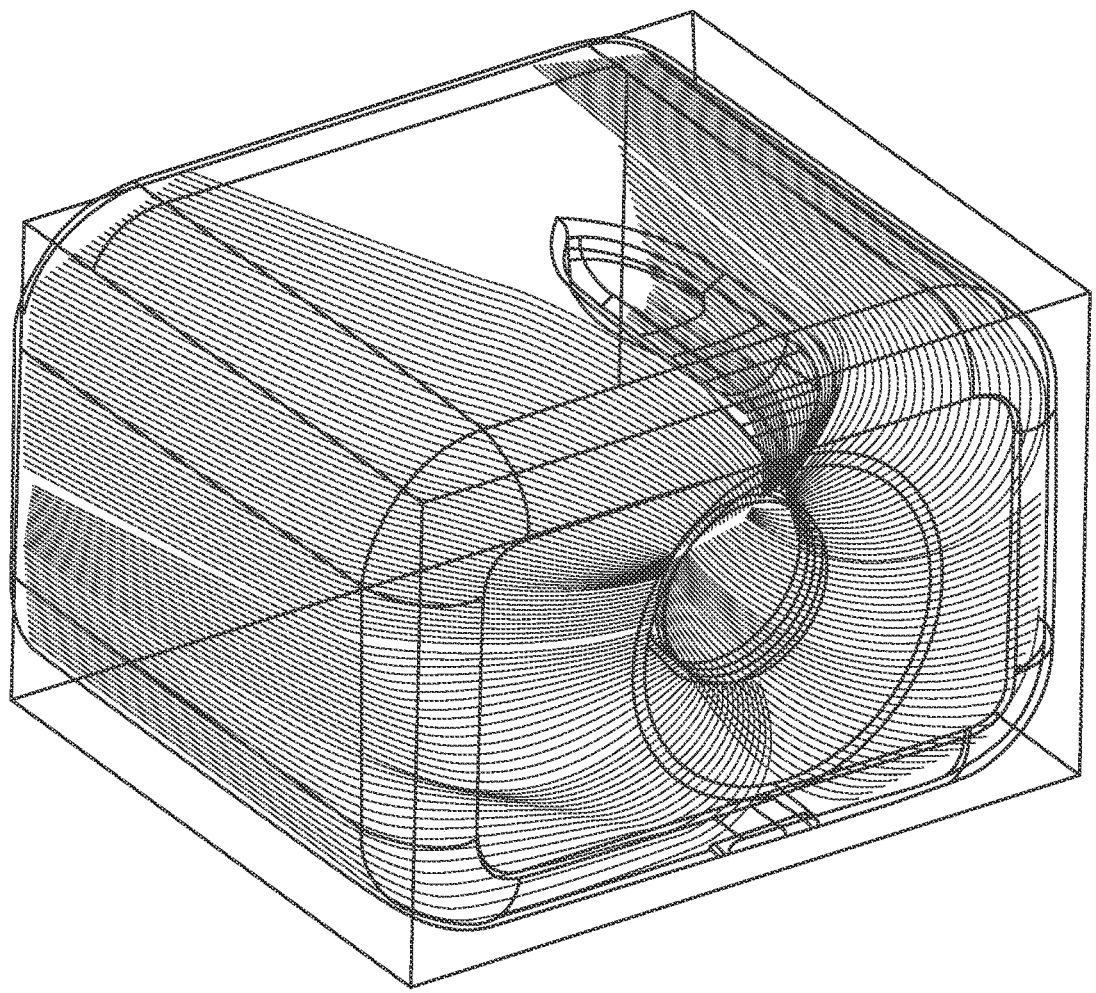
FIG. 13 depicts a graphical representation of coolant flow in a system according to an aspect of the disclosure.

FIG. 13 depicts a representation of air flow into, through, and out of the system 10. It will be appreciated that the airflow parameters can be differed based on changing one or more components described throughout this application, such as, but not limited to, the placement and/or number of intake ports, placement and/or number of exhaust ports, the shape of the housing, additional components on the housing (e.g. a door), the control means 164 and their operation, the temperature and/or composition of the coolant, and/or another component of the systems as described throughout this application.

Figure 12:
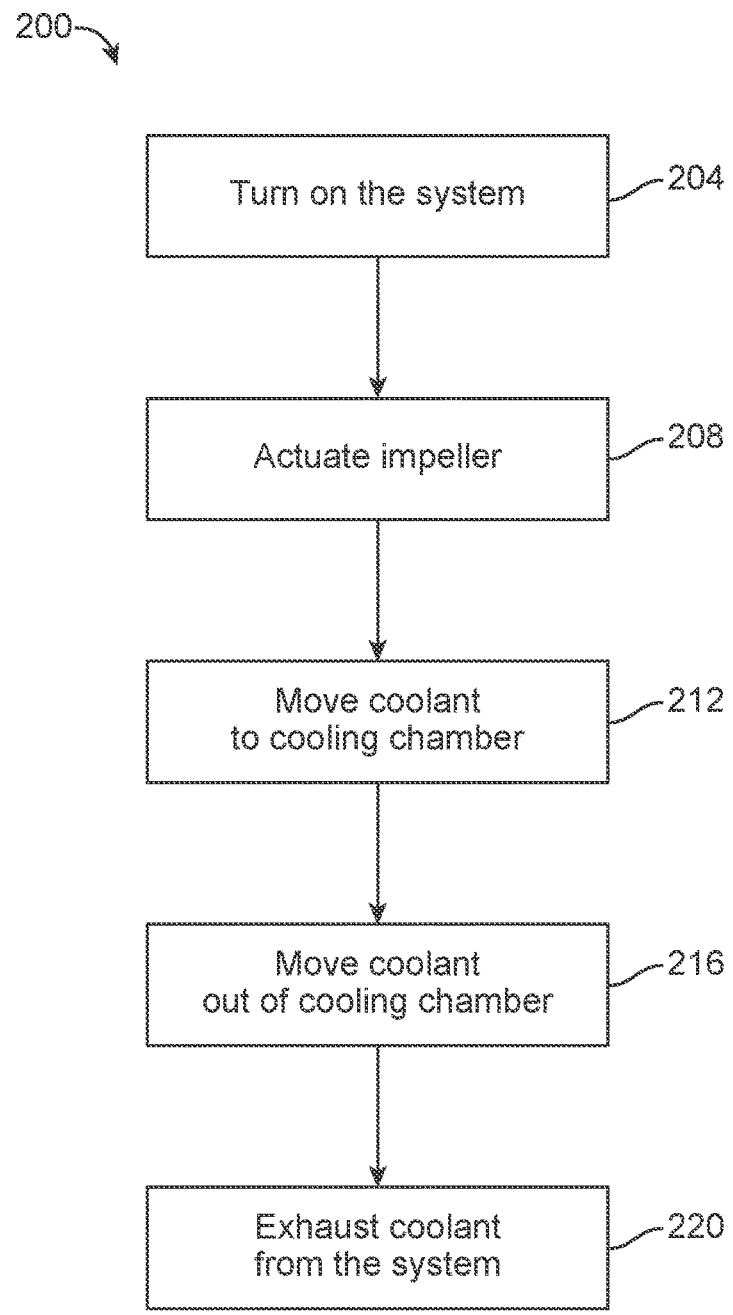
FIG. 12 illustrates a flow chart depicting a process of operating a system according to an aspect of the disclosure.

Disclosed throughout this application are also methods of operating a system 10. An exemplary method of operation is depicted in the process 200 shown in FIG. 12. The system 10 may be actuated in step 204. Actuation may be accomplished via any known method, such as pushing a button, flipping a switch, or sending an electronic command to a connected controller. In some aspects, the system 10 may be configured to be turned on automatically in response to a stimulus, such as a reading by one or more sensors within the system 10 of one or more parameters of the fuel cells 12. The actuation step may include the step of activating the impeller 138 or the other means for moving coolant through the system 10.

In step 208, the impeller 138 may cause movement of the coolant into the system 10 by causing coolant to enter the one or more intake ports 120 and move into the one or more intake channels 124. Coolant may be sucked into the intake ports 120 from the environment peripheral to the intake ports 120 on the housing 100. Coolant may be moved through the intake channels 124 towards the cooling chamber 112. Optionally, some or all of the coolant may be directed to the bypass channel 162 and/or to the bypass chamber 160.

In step 212, coolant is moved into and through the cooling chamber 112. The coolant contacts and passes by, through, and/or around the one or more fuel cell stacks 14. The coolant draws heat from the fuel cell stacks 14, thus cooling the fuel cell stacks 14. The coolant may circulate through the cooling chamber 112.

In step 216, the coolant is moved from the cooling chamber 112 to the exhaust channel 134. As explained above, the exhaust channel 134 may be adjacent to, overlapping with, or the same as the bypass chamber 160. The coolant is moved into the exhaust channel 134 and towards the exhaust port 130.

In step 220, the coolant is expelled from the exhaust port 130 to the environment. The coolant may be expelled at a predetermined velocity such that at least a portion of the coolant is moved to at least the threshold distance TD so as to minimize recirculation of the coolant.

Optionally, the process 200 may further include one or more steps of introducing one or more components of a fuel cell into the system 10.

Optionally, the process 200 may further include the step of controlling a control means 164 configured to direct all, none, or a portion of the coolant to the cooling chamber 112 and to the bypass chamber 160.

Optionally, the process 200 may further include the step of connecting the system 10 with an apparatus to provide power from the system 10 to the apparatus.

Throughout this specification, words are to be afforded their normal meaning as would be understood by those skilled in the relevant art. However, so as to avoid misunderstanding, the meanings of certain terms will be specifically defined or clarified.

While the disclosure has been described in connection with the various embodiments of the various figures, it will be appreciated by those skilled in the art that changes could be made to the embodiments described above without departing from the broad inventive concept thereof. It is understood, therefore, that this disclosure is not limited to the particular embodiments disclosed, and it is intended to cover modifications within the spirit and scope of the present disclosure as defined by the claims.

Features of the disclosure that are described above in the context of separate embodiments may be provided in combination in a single embodiment. Conversely, various features of the disclosure that are described in the context of a single embodiment may also be provided separately or in any sub-combination. Finally, while an embodiment may be described as part of a series of steps or part of a more general structure, each said step may also be considered an independent embodiment in itself, combinable with others.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed:

1. A duct system for cooling fuel cells via a coolant fluid, the system comprising:
    a housing having an interior volume;
    a cooling chamber within the housing;
    a fuel cell stack within the cooling chamber having a first face for receiving coolant fluid and a second face spaced from the first face for an exit of coolant;
    a plurality of intake ports configured to receive the coolant into the system;
    an exhaust port configured to expel the coolant from the system; and
    a fan for moving the coolant in the cooling chamber between the first face and the fuel cell stack into, through, and out of the system;
    a bypass chamber separate from the cooling chamber, the bypass chamber being in fluid communication with the exhaust port;
    one or more louver and valve configured to direct the coolant to one or more components of the system; and,
    wherein the one or more louver and valve has a first configuration to direct all of the coolant to the cooling chamber and none of the coolant to the bypass chamber, a second configuration to direct all of the coolant to the bypass chamber and none to the cooling chamber, and a third configuration, wherein a first portion of the coolant is directed to the cooling chamber while a second portion of the coolant is directed to the bypass chamber, wherein the plurality of intake ports and the exhaust port are on the first face, and wherein each of the plurality of intake ports is disposed radially around the exhaust port.

2. The system of claim 1, wherein the housing includes a first face and a second face spaced from the first face along a first direction.

3. The system of claim 2, wherein the intake port and the exhaust port are on the first face.

4. The system of claim 1, wherein the housing includes an intake channel and an exhaust channel, the intake channel and the exhaust channel being in fluid communication with the cooling chamber and with each other, wherein the intake channel is in fluid communication with the inlet port and the exhaust channel is in fluid communication with the exhaust port.

5. The system of claim 1, wherein the housing includes a curved surface thereon that extends into the cooling chamber and is configured to direct at least a portion of the coolant fluid flowing towards the first face of the fuel cell stack.

6. The system of claim 5 wherein the housing defines a protrusion extending therefrom, the protrusion defining one or both of the intake port and the exhaust port, the protrusion being configured to direct the coolant along a predetermined flow path.

7. The system of claim 6, further comprising a bypass chamber separate from the cooling chamber, the bypass chamber being in fluid communication with the exhaust port.

8. The system of claim 1, wherein the housing includes a curved surface disposed on the interior surface and extending into the cooling chamber, the curved surface having a predetermined shape.

9. The system of claim 8, wherein the curved surface is configured to receive the coolant and to impart a Coanda effect on the coolant such that the coolant is directed throughout the cooling chamber according to a predetermined distribution pattern.

* * * * *